United States Patent
Kim et al.

(10) Patent No.: US 9,490,735 B2
(45) Date of Patent: Nov. 8, 2016

(54) MOTOR DRIVING MODULE AND BRUSHLESS DC MOTOR SYSTEM

(71) Applicant: Electronics and Telecommunications Research Institute, Daejeon (KR)

(72) Inventors: Minki Kim, Daejeon (KR); Jimin Oh, Daejeon (KR); Jung Hee Suk, Daejeon (KR); Yil Suk Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 245 days.

(21) Appl. No.: 13/910,201

(22) Filed: Jun. 5, 2013

(65) Prior Publication Data

US 2014/0159632 A1 Jun. 12, 2014

(30) Foreign Application Priority Data

Dec. 10, 2012 (KR) .................. 10-2012-0142909

(51) Int. Cl.
  *H02P 6/18* (2016.01)
  *H02P 7/00* (2016.01)

(52) U.S. Cl.
  CPC . *H02P 7/00* (2013.01); *H02P 6/18* (2013.01); *H02P 6/182* (2013.01); *H02P 6/188* (2013.01)

(58) Field of Classification Search
  CPC .......................................... H02P 6/18
  USPC ................................... 318/400.02
  See application file for complete search history.

(56) References Cited

U.S. PATENT DOCUMENTS

| | | | | |
|---|---|---|---|---|
| 6,023,417 A | * | 2/2000 | Hava | H02M 7/53875 318/811 |
| 7,304,452 B2 | | 12/2007 | Nagai et al. | |
| 2008/0191657 A1 | * | 8/2008 | Ichiki et al. | 318/729 |
| 2009/0009115 A1 | * | 1/2009 | Grogg et al. | 318/400.34 |
| 2010/0066283 A1 | * | 3/2010 | Kitanaka | 318/400.02 |
| 2011/0214934 A1 | * | 9/2011 | Ueda et al. | 180/446 |

FOREIGN PATENT DOCUMENTS

| | | |
|---|---|---|
| KR | 10-0505253 B1 | 7/2005 |
| KR | 10-1055848 B1 | 8/2011 |
| KR | 10-2012-0063152 A | 6/2012 |

OTHER PUBLICATIONS

Tzuen-Lih Chern et al., "DSP-Based Brushless DC Motor Sensorless Drivers with Sine PWM", International Conference on Power Electronics and Drive Systems, Nov. 2-5, 2009, pp. 1349-1353.

* cited by examiner

*Primary Examiner* — Kawing Chan
(74) *Attorney, Agent, or Firm* — Rabin & Berdo, P.C.

(57) ABSTRACT

A motor driving module is provided which includes a motor driving unit configured to control a PWM inverter on the basis of positional information and a control signal; a PWM inverter configured to output three-phase voltages on the basis of DC power according to control of the motor driving unit; a phase voltage estimating unit configured to output three-phase estimated voltages on the basis of the positional information, the DC power, and a voltage modulation index; and a position detecting unit configured to output the positional information on the basis of the three-phase estimated voltages, wherein the positional information is on an external motor that operates on the basis of the three-phase voltages.

10 Claims, 7 Drawing Sheets

MOTOR DRIVING MODULE AND BRUSHLESS DC MOTOR SYSTEM

CROSS-REFERENCE TO RELATED APPLICATIONS

This U.S. non-provisional patent application claims priority under 35 U.S.C. §119 of Korean Patent Application No. 10-2012-0142909, filed on Dec. 10, 2012, the entire contents of which are hereby incorporated by reference.

BACKGROUND OF THE INVENTION

The present invention disclosed herein relates to a motor, and more particularly, to a motor driving module and a brushless DC (BLDC) motor system.

A motor is a device that converts electrical energy into mechanical energy by using the force of current in a magnetic field. The motor is classified into an AC motor and a DC motor according to a type of input power. The AC motor rotates a rotor by supplying current to the windings of a stator to change a magnetic field. The DC motor rotates a rotor by supplying a predetermined current to a rotor. At this point, the DC motor allows current to flow in a predetermined direction by using a brush regardless of the position of a rotor.

Recently, as power electronic control technology has been developed, a BLDC motor without a brush is developed through electronic switching technology. Since the BLDC motor does not use a brush, the heat generation and wear of a brush due to mechanical friction may be prevented. However, in order to control the BLDC motor, an additional device for detecting the position of a rotor is required.

SUMMARY OF THE INVENTION

The present invention provides a motor driving module and a brushless DC (BLDC) motor system that estimate a three-phase voltage to detect a position of a rotor.

One aspect of embodiments of the present invention provides a motor driving module including a motor driving unit configured to control a PWM inverter on the basis of positional information and a control signal; a PWM inverter configured to output three-phase voltages on the basis of DC power according to control of the motor driving unit; a phase voltage estimating unit configured to output three-phase estimated voltages on the basis of the positional information, the DC power, and a voltage modulation index; and a position detecting unit configured to output the positional information on the basis of the three-phase estimated voltages, wherein the positional information is on an external motor that operates on the basis of the three-phase voltages.

In example embodiments, the voltage modulation index is a predetermined value on the basis of a PWM type.

In example embodiments, the phase voltage estimating unit comprises a sinusoidal signal generator configured to generate a plurality of sinusoidal waves on the basis of the positional information; and a phase voltage calculating unit configured to calculate three-phase estimated voltages on the basis of the plurality of sinusoidal waves, the voltage modulation index, and the DC power.

In example embodiments, each of the plurality of sinusoidal waves has the same phase and frequency as those of the fundamental wave components of the three-phase voltages.

In example embodiments, the position detecting unit comprises a back electromotive force (EMF) calculating unit configured to calculate three-phase back EMF on the basis of the three-phase estimated voltages; and a position information detecting unit configured to detect the positional information on the basis of the three-phase back EMF.

In example embodiments, the external motor does not include a position sensor that detects a position of a rotor.

The motor driving module of claim 1, wherein the three-phase estimated voltages have the same phases and frequencies as those of the fundamental wave components.

Other aspect of embodiments of the present invention provides a brushless direct current (BLDC) motor system including a motor driving unit configured to control a PWM inverter on the basis of positional information and a control signal; a PWM inverter configured to output three-phase voltages on the basis of DC power according to control of the motor driving unit; a BLDC motor configured to operate on the basis of the three-phase voltages; a phase voltage estimating unit configured to output three-phase estimated voltages on the basis of the positional information, the DC power, and a voltage modulation index; and a position detecting unit configured to output the positional information on the basis of the three-phase estimated voltages.

In example embodiments, the positional information indicates on a rotor that is included in the BLDC motor.

In example embodiments, the BLDC motor does not include a position sensor that detects a position of a rotor.

Still other aspect of embodiments of the present invention provides a operating method for a motor driving module controlling a BLDC motor. The operating method comprises generating three-phase estimated voltages on the basis of a control signal, a voltage modulation index, and positional information; calculating three-phase back EMF on the basis of the generated three-phase estimated voltages; and outputting positional information on the basis of the calculated three-phase back EMF, wherein the voltage modulation index is determined on the basis of a PWM type of power that is applied to the BLDC motor, and the positional information is on a rotor that is included in the BLDC motor.

In example embodiments, the generating of the three-phase estimated voltages comprises generating a plurality of sinusoidal waves on the basis of the positional information; and generating three-phase estimated voltages on the basis of the generated plurality of sinusoidal waves and the voltage modulation index.

In example embodiments, each of the plurality of sinusoidal waves has the same phase and frequency as those of fundamental wave components of three-phase voltage that is applied to the BLDC motor.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, particular embodiments of the present invention will be described with reference to the accompanying drawings to fully explain the present invention in such a manner that it may easily be carried out by a person with ordinary skill in the art to which the present invention pertains.

A position of a rotor of a brushless DC (BLDC) motor should be sensed in order to control a sensor-less BLDC motor. The BLDC motor system according to an embodiment of the present invention estimates three-phase voltages applied to the BLDC motor, based on a reference voltage and a PWM voltage modulation index (M), and obtains positional information of the rotor. Thus, since distortion and noise decrease in the process of obtaining the three-phase voltage, a performance of the BLDC motor system is enhanced. For simplicity of descriptions, the BLDC motor system according to an embodiment of the present invention is described based on position detection of the rotor. However, the scope of the present invention is not limited thereto, and it is possible to obtain information on a speed of the BLDC motor based on the position detection of the rotor.

Figure 1:
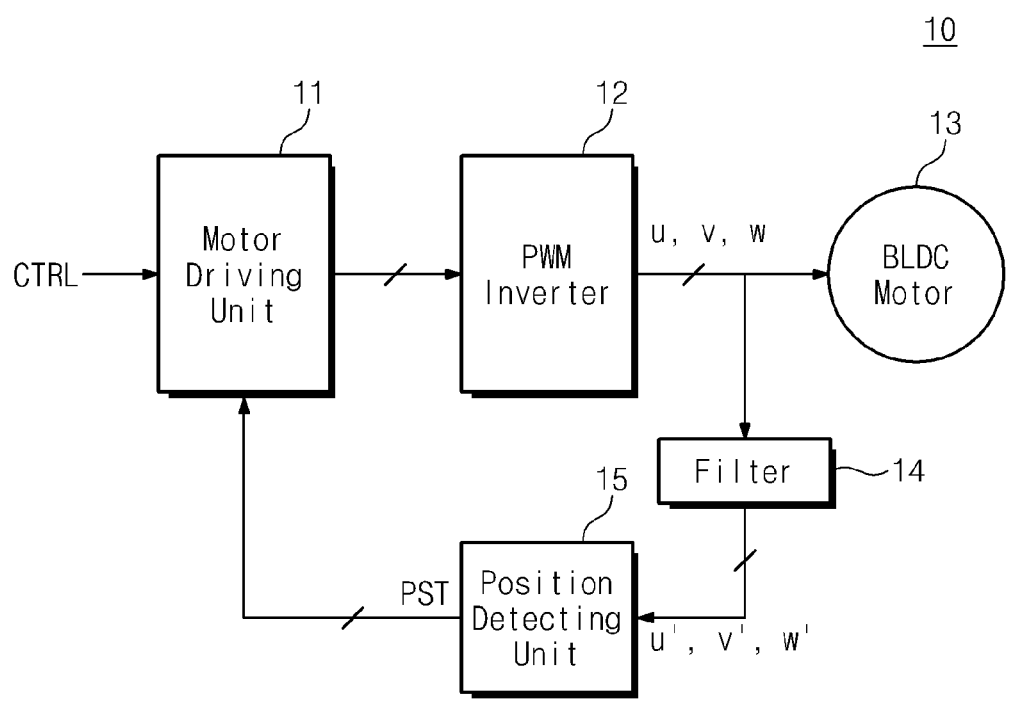
FIG. 1 is a block diagram of a BLDC motor system.

FIG. 1 is a block diagram of a BLDC motor system. Referring to FIG. 1, a BLDC motor system 10 includes a motor driving unit 11, a pulse width modulation (PWM) inverter 12, a BLDC motor 13, a filter 14, and a position detecting unit 15.

The motor driving unit 11 controls the PWM inverter 12 based on positional information PST and a control signal CTRL. For example, the motor driving unit 11 may receive the positional information PST from the position detecting unit 15. The motor driving unit 11 may receive the control signal CRTL from an external device. The control signal CTRL may be a signal that is generated based on information such as a target speed, target torque, etc. of the BLDC motor 13.

The motor driving unit 11 may control a plurality of switches, which are included in the PWM inverter 12, based on the received positional information PST and the received control signal CTRL. In example embodiments, if the BLDC motor system 100 operates based on a three-phase voltage, the PWM inverter 12 may include six power switches. In this case, the motor driving unit 11 will output six switching signals that control the six power switches.

The PWM inverter 12 generates three-phase voltages u, v, and w according to the control of the motor driving unit 11 and supplies them to the BLDC motor 13. In example embodiments, phases of the three-phase voltages u, v, and w may be different from one another by 120°. In example embodiments, the three-phase voltages u, v, and w may be provided in the form of a square wave that includes a harmonic wave.

The BLDC motor 13 may operate based on the received three-phase voltages u, v, and w. For example, the BLDC motor 13 includes a rotor and a stator. The rotor may be provided as a permanent magnet. The three-phase voltages u, v, and w are supplied to a coil of the stator. Fundamental waves of the three-phase voltages u, v, and w are sinusoidal waves that have specific frequencies and phases. Thus, a magnetic field which is generated from the stator by the three-phase voltages u, v, and w varies. Electromagnetic force is generated according to electromagnetic induction based on the direction of a varying magnetic field. The rotor rotates by the generated electromagnetic force.

In example embodiments, the BLDC motor 13 may not include a position sensor. In other words, the BLDC motor 13 may be provided in a sensor-less type. Back electromotive force (EMF) generated from the BLDC motor 13 may include positional information of the rotor. For example, the rotor of the BLDC motor 13 may be provided as a permanent magnet. A rotating field is generated by the rotation of the rotor. Thus, back EMF is generated by electromagnetic induction. If the BLDC motor 13 operates based on three-phase voltages u, v, and w, three-phase back EMF generated from the BLDC motor 13 may be different from one another by an electrical angle of 120°. That is, it is possible to detect a position of the rotor of the BLDC motor 13 based on the difference between electrical angles of the three-phase back EMF, the frequencies of the three-phase back EMF, etc. In example embodiments, u-phase back EMF $E_u$ generated from the BLDC motor 13 is indicated in Equation 1.

$$E_u = (V_u - V_n) - L\frac{di_u}{dt} - R_u i_u \qquad \text{Equation 1}$$

Referring to Equation 1, $E_u$ indicates u-phase back EMF, $V_u$ indicates a level of a u-phase voltage applied to the BLDC motor 13, $V_n$ indicates a neutral voltage, L indicates an inductance included in the BLDC motor 13, $R_u$ indicates a u-phase resistance, and $i_u$ indicates a u-phase current.

The filter 14 may remove harmonic components from the three-phase voltages applied to the BLDC motor 13. For example, the three-phase voltages u, v, and w applied to the BLDC motor 13 include harmonic components. In order to detect a position of a rotor, three-phase voltages having the form of a sinusoidal wave are needed. The filter 14 may filter out fundamental wave components of the three-phase voltages to output fundamental waves u', v', and w' of the three-phase voltages. In example embodiments, the fundamental waves of the three-phase voltages may be provided as sinusoidal waves. The three-phase voltages u, v, and w will be described in more detail with reference to FIGS. 2 and 3.

The position detecting unit 15 may detect a position of a rotor included in the BLDC motor 13 and output positional information PST. For example, as described with reference to Equation 1, the position detecting unit 15 may receive three-phase voltages u, v, and w applied to the BLDC motor 13 and obtain three-phase back EMF. The position detecting unit 15 may detect the positional information of the rotor based on three-phase back EMF and output the detected positional information PST. In example embodiments, the position detecting unit 15 may receive the fundamental wave components u', v', w' of the three-phase voltages from the filter 14.

Figure 2:
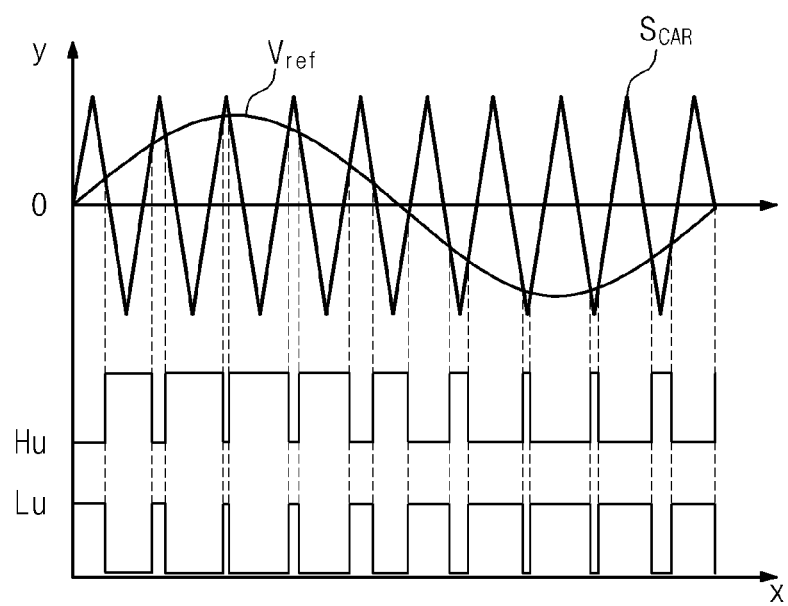
FIG. 2 is an exemplary graph of a PWM type.

FIG. 2 is an exemplary graph of a PWM type. In example embodiments, the Y axis of the graph represented in FIG. 2 indicates amplitude of a signal, the X axis thereof indicates an electrical angle. In example embodiments, the graph represented in FIG. 2 represents a sinusoidal PWM (SPWM) type. However, the present invention is not limited thereto.

Referring to FIG. 2, the motor driving unit 11 may generate a reference voltage $V_{ref}$. The motor driving unit 11 may compare the generated reference voltage $V_{ref}$ with a carrier CAR and generate switching signals Hu and Lu to generate a u-phase voltage u. For example, the carrier CAR may be a signal that is predetermined according to a PWM type. The carrier CAR may be a pulse signal that has a constant frequency, such as a sawtooth wave, a triangle wave, a square wave, and so on. The motor driving unit 11 may compare the reference voltage $V_{ref}$ with the carrier CAR.

As represented in FIG. 2, the motor driving unit 11 outputs a first switching signal Hu to a logic high while the reference voltage $V_{ref}$ is higher than the carrier CAR. While the reference voltage $V_{ref}$ is lower than the carrier CAR, the motor driving unit 11 outputs the first switching signal Hu to a logic low. A second switching signal Lu is a signal that is obtained through the inverse of the first switching signal Hu. As an example, the first and second switching signals Hu and Lu are transmitted to the PWM inverter 12. The PWM inverter 12 may generate a u-phase voltage u based on the first and second switching signals Hu and Lu.

Figure 3:
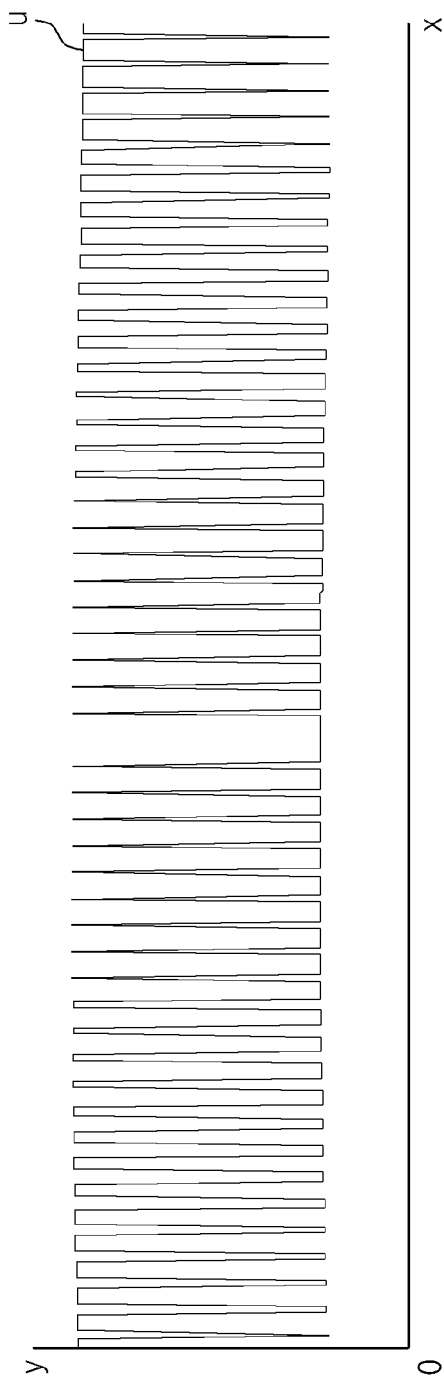
FIG. 3 is an exemplary graph of a u-phase voltage.

FIG. 3 is an exemplary graph of a u-phase voltage. Referring to FIGS. 2 and 3, the PWM inverter 12 may receive a plurality of switching signals from the motor driving unit 11. For example, the PWM inverter 12 may receive, from the motor driving unit 11, the first and second switching signals Hu and Lu that are described with reference to FIG. 2. The PWM inverter 120 will output the u-phase voltage u represented in FIG. 3, based on the received first and second switching signals Hu and Lu. In example embodiments, the u-phase voltage u output from the PWM inverter 12 is in the form of a square wave including a harmonic wave. In example embodiments, if the BLDC motor 130 operates based on three-phase power, the motor driving unit 110 will output six switching signals.

In example embodiments, in order to detect a position of a rotor, three-phase voltages in the form of a sinusoidal wave are needed. Since the three-phase voltages u, v, and w are in the form of a square wave including a harmonic wave, the filter 14 is needed. Thus, since distortion and delay of the three-phase voltages u, v, and w occur. Therefore, a compensating device is needed, the cost of the BLDC motor system increases, and performance decreases.

Figure 4:
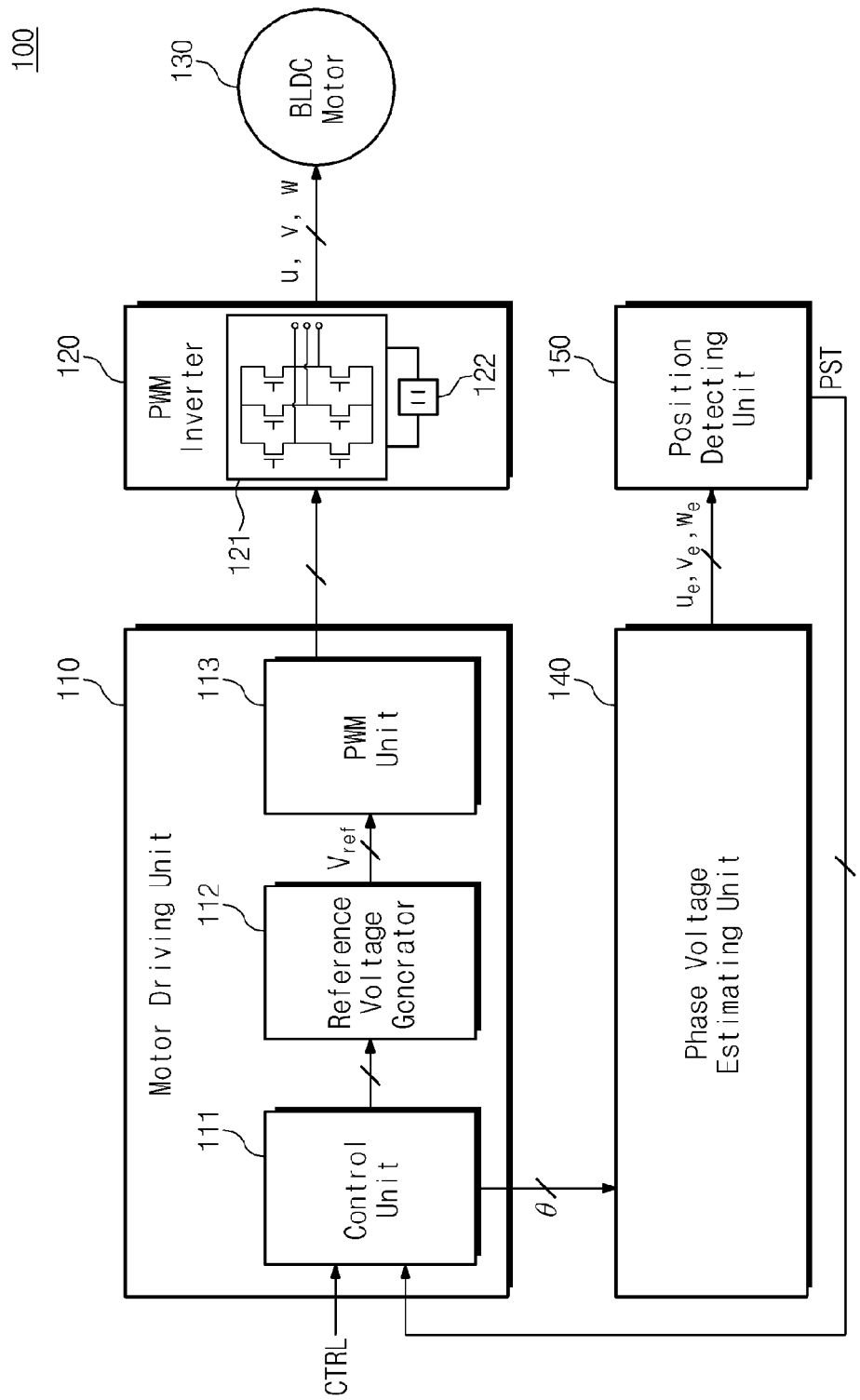
FIG. 4 is a block diagram of a BLDC motor system according to an embodiment of the present invention.

FIG. 4 is a block diagram of a BLDC motor system according to an embodiment of the present invention. For ease of descriptions, the operation of the BLDC motor system 100 is described based on the position detection of a rotor that is included in the BLDC motor 130. However, the scope of the present invention is not limited thereto, and it is possible to detect the speed of the BLDC motor 130 from the position of the rotor.

Referring to FIG. 4, the BLDC motor system 100 includes a motor driving unit 110, a PWM inverter 120, a BLDC motor 130, a phase voltage estimating unit 140, and a position detecting unit 150.

The motor driving unit 110 may receive a control signal CTRL from an external device, and receive positional information PST from the position detecting unit 150. The motor driving unit 110 may control the PWM inverter 120 based on the received control signal CTRL and the received positional information PST. The motor driving unit 110 includes a control unit 111, a reference voltage generator 112, and a PWM unit 113.

The control unit 111 may receive the positional information PST from the position detecting unit 150 and sense the position of a rotor that is included in the BLDC motor 130. The control unit 111 controls a phase of a reference voltage $V_{ref}$ based on the sensed position of the rotor.

The control unit 111 may receive the control signal CTRL and control the amplitude or frequency of the reference voltage $V_{ref}$. For example, the control signal CTRL may include information on a target speed of the BLDC motor 130. The control unit 111 may control the amplitude or frequency of the reference voltage $V_{ref}$ based on the information on the target speed. If the speed of the BLDC motor 130 is lower than the target speed, the control unit 111 may increase the amplitude or frequency of the reference voltage $V_{ref}$. On the contrary, if the speed of the BLDC motor 130 is higher than the target speed, the control unit 111 may decrease the amplitude or frequency of the reference voltage $V_{ref}$.

The reference voltage generator 112 may generate the reference voltage $V_{ref}$ according to the control of the control unit 111. The generated reference voltage $V_{ref}$ is transmitted to the PWM unit 113. In example embodiments, the form of the reference voltage $V_{ref}$ may vary depending on a PWM type.

The PWM unit 113 may output a plurality of switching signals based on the received reference voltage $V_{ref}$. For example, the PWM unit 113 may output the plurality of switching signals in such a way described with reference to FIG. 2.

The PWM inverter 120 includes the inverter 121 and a DC-link 122. The inverter 121 receives a plurality of switching signals from the PWM unit 113 and outputs three-phase voltages u, v, and w based on the received plurality of switching signals. The DC-link 122 supplies power to enable the inverter 121 to output the three-phase voltages u, v, and w. In example embodiments, the three-phase voltages u, v, and w may be in the form of a square wave. In example embodiments, the maximum value of the three-phase voltages u, v, w may be the voltage $V_{DC}$ of the DC-link 122. The BLDC motor 130 has been described with reference to FIG. 1 and a description thereof is thus not repeated.

The BLDC motor system 100 of FIG. 4 further includes the phase voltage estimating unit 140 as compared to the BLDC motor system 100 of FIG. 1. The difference between the BLDC motor system 100 of FIG. 4 and the BLDC motor system 10 of FIG. 1 will be described below.

The BLDC motor system 10 of FIG. 1 measures three-phase voltages applied to the BLDC motor 13 to detect the position of a rotor. However, the phase voltage estimating unit 140 included in the BLDC motor system 100 according to an embodiment of the present invention estimates three-phase estimated voltages $u_e$, $v_e$, $w_e$ based on a position signal (θ) generated from the motor driving unit 110, a PWM type, and the voltage $V_{DC}$ of the DC-link 122. The following Equation 2 indicates the u-phase estimated voltage $u_e$.

$$u_e = kM\frac{V_{DC}}{2}\sin(\theta) \qquad \text{Equation 2}$$

Referring to Equation 2, $u_e$ indicates an u-phase estimated voltage, k indicates a constant that is determined based on a property of a power device included in the BLDC motor system, M indicates a voltage modulation index according to the PWM type, $V_{DC}$ indicates the voltage of the DC-link 120 included in the PWM inverter 120, and θ indicates the electrical position of a rotor. That is, the phase voltage estimating unit 140 may estimate three-phase voltages applied to the BLDC motor 130 to generate three-phase estimated voltages $u_e$, $v_e$, $w_e$. The voltage modulation index M indicates the ratio of the maximum voltages $V_{peak}$ of the fundamental wave components of the DC-link voltage $V_{DC}$ and three-phase voltages u, v, and w. The voltage modulation index M will be described in more detail with reference to FIGS. 5A and 5B.

The position detecting unit 150 may receive three-phase estimated voltages $u_e$, $v_e$, and $w_e$ and detect the position of a rotor of the BLDC motor 130 based on the received three-phase estimated voltages $u_e$, $v_e$, and $w_e$. In example embodiments, the position detecting unit 150 may calculate back EMF based on the three-phase estimated voltages $u_e$, $v_e$, and $w_e$ as described with reference to Equation 1. The position detecting unit 150 may detect the position of the rotor based on the calculated back EMF. The phase voltage estimating unit 140 and the position detecting unit 150 will be described in more detail with reference to FIGS. 6 and 7.

The BLDC motor system 100 according to an embodiment of the present invention described above estimates three-phase voltages applied to the BLDC motor and thus distortion and delay of a signal by a filter do not occur. Thus, the BLDC motor system provides enhanced performance.

Figure 5A:
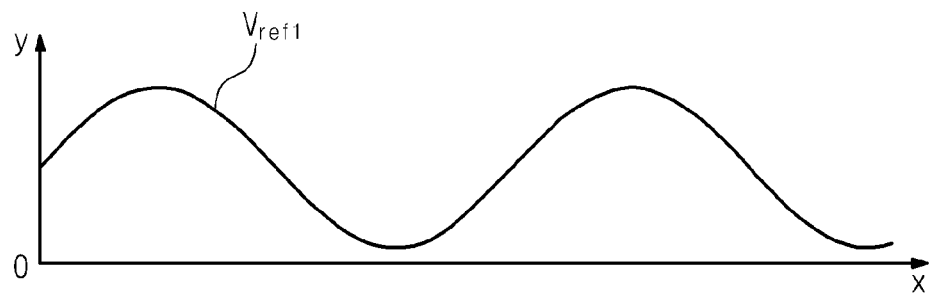
FIGS. 5A and 5B are exemplary graphs of reference voltages.
Figure 5B:
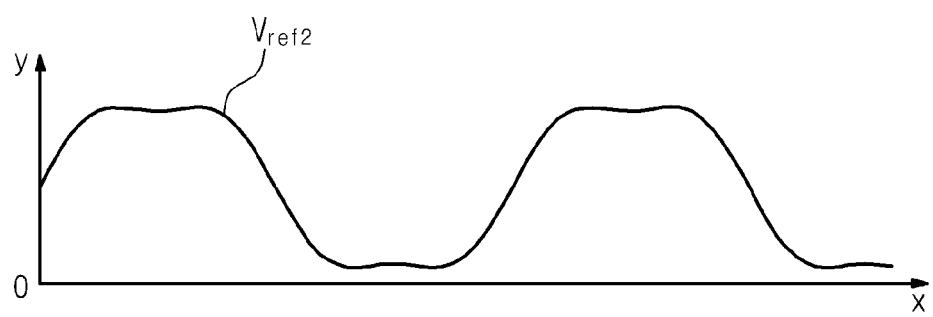

FIGS. 5A and 5B are exemplary graphs of reference voltages. In example embodiments, the X axes of the graphs of FIGS. 5A and 5B indicate electrical angles, and the Y axes thereof indicate the amplitude of a signal. In example embodiments, reference voltages $V_{ref1}$, $V_{ref2}$ of SPWM and third harmonic PWM (THPWM) types are described with reference to FIGS. 5A and 5B. However, the present invention is not limited thereto and the BLDC motor system according to the present invention may be driven based on various PWM types.

Referring to FIGS. 5A and 5B, a first reference voltage $V_{ref1}$ is a sinusoidal wave. A second voltage $V_{ref2}$ is a waveform including a third harmonic wave. A PWM type using the first reference voltage $V_{ref1}$ is called a SPWM type. A PWM type using the second reference voltages $V_{ref2}$ is called a THPWM type. In example embodiments, the voltage modulation index varies depending on the type of the PWM. The following Table 1 represents SPWM and THPWM voltage modulation indexes and waveform factors.

TABLE 1

| PWM type | Waveform Factor ($V_{rms}/V_{DC}$) | Voltage modulation Index (M, $V_{peak}/V_{DC}$) |
|---|---|---|
| SPWM ($V_{ref1}$) | 61.2% | 86.5% |
| THPWM ($V_{ref2}$) | 70.7% | 99.9% |

Referring to Table 1, if three-phase voltages u, v, and w are generated based on the first reference voltage $V_{ref1}$, the voltage modulation index M may be 0.865. If the three-phase voltages u, v, and w are generated based on the second reference voltage $V_{ref2}$, the voltage modulation index M may be 0.999. In other words, if the three-phase voltages u, v, and w are generated based on the SPWM type, the maximum voltages $V_{peak}$ of the fundamental waves of the generated three-phase voltages u, v, and w would be 0.865 times the voltage $V_{DC}$ of the DC-link 122. If the three-phase voltages u, v, and w are generated based on the THPWM type, the maximum voltages $V_{peak}$ of the fundamental waves of the generated three-phase voltages u, v, and w would be 0.999 times the voltage $V_{DC}$ of the DC-link 122. That is, the voltage modulation index M applied to the phase voltage estimating unit 140 would vary depending on the type of the PWM used in the BLDC motor system 100.

Figure 6:
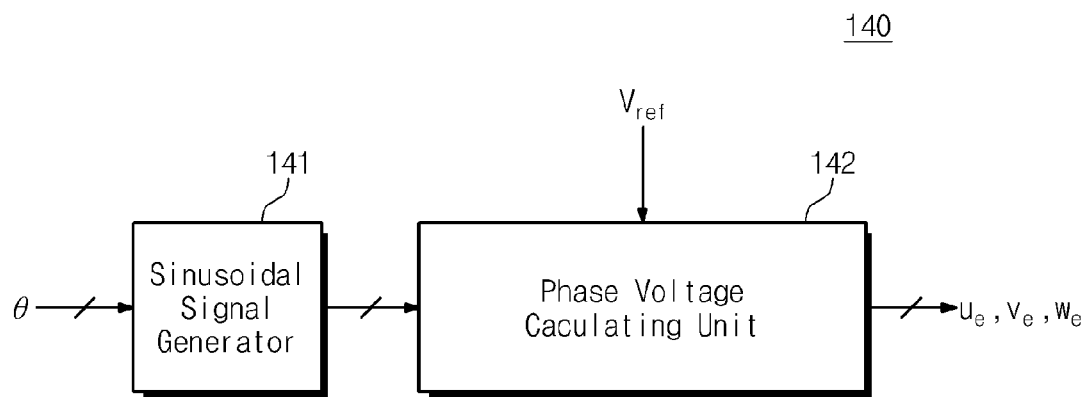
FIG. 6 is a detailed block diagram of a phase voltage estimating unit of FIG. 4.

FIG. 6 is a detailed block diagram of a phase voltage estimating unit of FIG. 4. Referring to FIG. 6, the phase voltage estimating unit 140 includes a sinusoidal signal generator 141 and a phase voltage calculating unit 142. The sinusoidal signal generator 141 may receive position signals 8 and generate a plurality of sinusoidal waves corresponding to the position signals 8. In example embodiments, the plurality of sinusoidal waves generated by the sinusoidal signal generator 141 may have the same frequencies and phases as those of the fundamental wave components of three-phase voltages u, v, and w.

The phase voltage calculating unit 142 may receive the plurality sinusoidal waves generated from the sinusoidal signal generator 141 and calculate three-phase estimated voltages $u_e$, $v_e$, and $w_e$ in such a way described with reference to Equation 2. In example embodiments, the phase voltage calculating unit 142 may include information on a plurality of PWM types and voltage modulation indexes M corresponding to the plurality of PWM types. The phase voltage calculating unit 142 may include operating information on the BLDC motor system 100 (e.g., a PWM type, a DC-link voltage value, properties of a power device, etc.).

Figure 7:
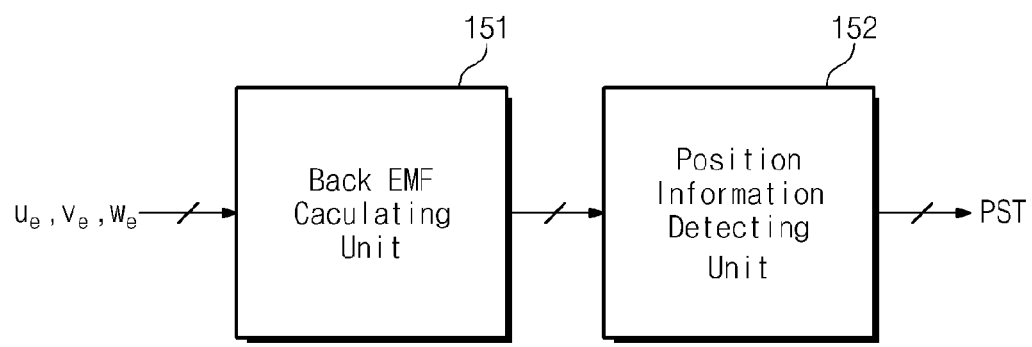
FIG. 7 is a detailed block diagram of a position detecting unit of FIG. 4.

FIG. 7 is a detailed block diagram of a position detecting unit of FIG. 4. Referring to FIG. 7, the position detecting unit 150 includes a back EMF calculating unit 151 and a position information detecting unit 152. The back EMF calculating unit 151 receives three-phase estimated voltages $u_e$, $v_e$, and $w_e$ from the phase voltage estimating unit 140 and calculates the back EMF. For example, the back EMF calculating unit 151 may obtain the back EMF based on the three-phase estimated voltages $u_e$, $v_e$, $w_e$ and Equation 1. In example embodiments, the back EMF calculating unit 151 may detect three-phase currents applied to the BLDC motor 130 through an external device such as a current probe.

The position detecting unit 150 receives three-phase back EMF from the back EMF calculating unit 151. The position detecting unit 150 may output the positional information PST of a rotor based on the received three-phase back EMF. In example embodiments, the position detecting unit 150 may compare the phases of the received three-phase back EMF to output the positional information PST of the rotor.

In example embodiments, the motor driving unit 110, PWM inverter 120, phase voltage estimating unit 140, and position detecting unit 150 that have been described above may be provided as one motor driving module (not shown).

Figure 8:
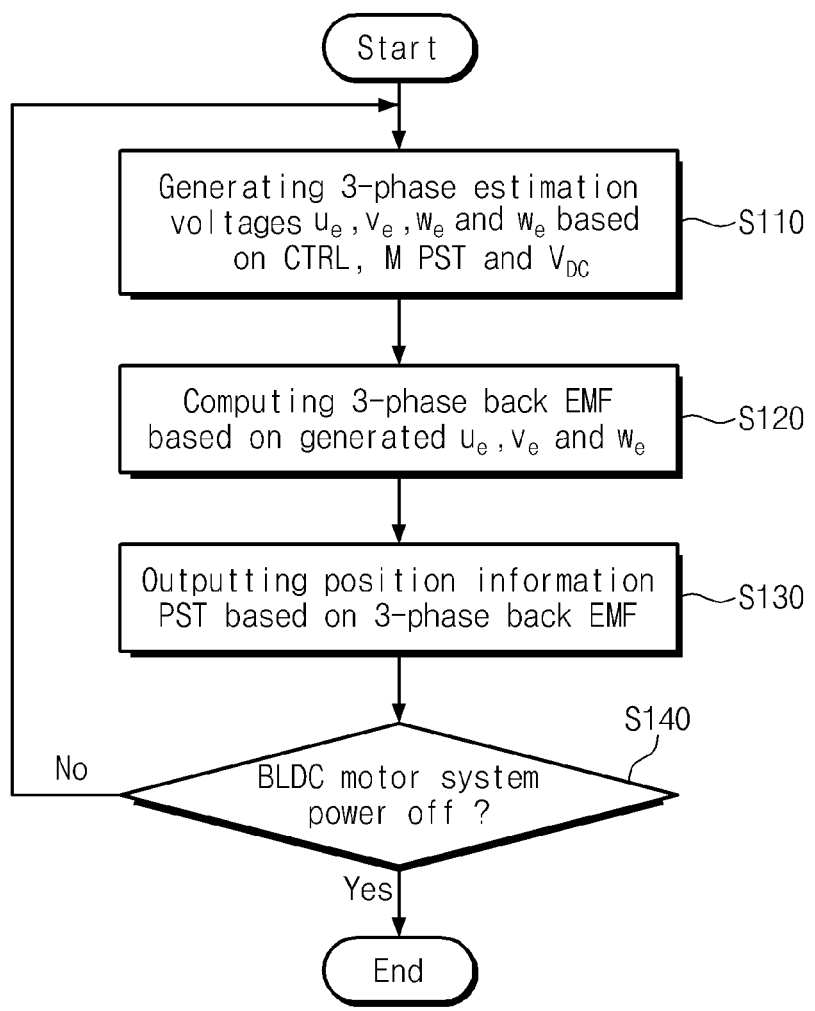
FIG. 8 is an exemplary flow chart of a method of operating a motor driving unit, a phase voltage estimating unit, and a position detecting unit of FIG. 4.

FIG. 8 is an exemplary flow chart of a method of operating a motor driving unit, a phase voltage estimating unit, and a position detecting unit of FIG. 4. For ease of descriptions, it is assumed that the motor driving unit 110, the phase voltage estimating unit 140, and the position detecting unit 150 are included in a motor driving unit.

Referring to FIGS. 4 and 8, in operating step S110, the motor driving module may generate three-phase estimated voltages $u_e$, $v_e$, and $w_e$ based on the control signal CRTL, voltage modulation index M, positional information PST, and DC-link voltage $V_{DC}$. For example, the phase voltage estimating unit 140 included in the motor driving module may generate the three-phase estimated voltages $u_e$, $v_e$, and $w_e$ in such a way described with reference to Equation 2.

In operating step S120, the motor driving module may compute three-phase back EMF $E_u$, $E_v$, and $E_w$ based on the generated three-phase estimated voltages $u_e$, $v_e$, and $w_e$. For example, the position detecting unit 150 may calculate the three-phase back EMF $E_u$, $E_v$, and $E_w$ in such a way described with reference to Equation 1 and FIG. 7.

In operating step S130, the motor driving module may output positional information PST based on the calculated three-phase back EMF $E_u$, $E_v$, and $E_w$. For example, the position detecting unit 150 included in the motor driving module may output positional information PST in such a way described with reference to FIG. 7.

In operating step S140, the motor driving module may determine whether a BLDC motor is in a power off state. For example, the motor driving unit 110 included in the motor driving module may receive a control signal CTRL. The control signal CTRL includes information on the operating mode of the BLDC motor 130. That is, the motor driving unit 110 may determine based on the control signal CTRL whether the BLDC motor 130 is in a power off state.

According to the determined result, if the BLDC motor is not in a power off state, the motor driving module performs the step S110. According to the determined result, if the BLDC motor is in a power off state, the motor driving module ends its operation.

The BLDC motor system according to the present invention described above generates three-phase estimated voltages based on a reference voltage and a voltage modulation index instead of directly measuring three-phase voltages applied to a BLDC motor to detect the position of a rotor. That is, since there is no need for a filter to remove harmonic components, the performance of the BLDC motor system is enhanced and a related cost decreases.

While particular embodiments have been described in the detailed description of the present invention, several variations may be made without departing from the scope of the present invention. Therefore, the scope of the present invention should not be limited to the embodiments described above and should be defined by the following claims and equivalents thereof.

What is claimed is:

1. A motor driving module, comprising:
a motor driving unit configured to control a pulse width modulation (PWM) inverter on the basis of positional information and a control signal, the motor driving unit including a reference voltage generator configured to generate a reference voltage that varies depending on a type of PWM;
a PWM inverter configured to output three-phase voltages on the basis of DC power according to control of the motor driving unit;
a phase voltage estimating unit configured to output three-phase estimated voltages on the basis of the positional information, the DC power, and a voltage modulation index that varies depending on the type of PWM and the reference voltage corresponding to the type of PWM; and
a position detecting unit configured to output the positional information on the basis of the three-phase estimated voltages,
wherein the positional information is on an external motor that operates on the basis of the three-phase voltages.

2. The motor driving module of claim 1, wherein the voltage modulation index is a predetermined value on the basis of the PWM type.

3. The motor driving module of claim 1, wherein the phase voltage estimating unit comprises:

a sinusoidal signal generator configured to generate a plurality of sinusoidal waves on the basis of the positional information; and
a phase voltage calculating unit configured to calculate three-phase estimated voltages on the basis of the plurality of sinusoidal waves, the voltage modulation index, and the DC power.

4. The motor driving module of claim 3, wherein each of the plurality of sinusoidal waves has the same phase and frequency as those of the fundamental wave components of the three-phase voltages.

5. The motor driving module of claim 1, wherein the position detecting unit comprises:
a back electromotive force (EMF) calculating unit configured to calculate three-phase back EMF on the basis of the three-phase estimated voltages; and
a position information detecting unit configured to detect the positional information on the basis of the three-phase back EMF.

6. The motor driving module of claim 1, wherein the external motor is sensor-less.

7. The motor driving module of claim 1, wherein the three-phase estimated voltages have the same phases and frequencies as those of the fundamental wave components.

8. A brushless direct current (BLDC) motor system, comprising:
a motor driving unit configured to control a pulse width modulation (PWM) inverter on the basis of positional information and a control signal, the motor driving unit including a reference voltage generator configured to generate a reference voltage that varies depending on a type of PWM;
a PWM inverter configured to output three-phase voltages on the basis of DC power according to control of the motor driving unit;
a BLDC motor configured to operate on the basis of the three-phase voltages;
a phase voltage estimating unit configured to output three-phase estimated voltages on the basis of the positional information, the DC power, and a voltage modulation index that varies depending on the type of PWM and the reference voltage corresponding to the type of PWM; and
a position detecting unit configured to output the positional information on the basis of the three-phase estimated voltages.

9. The BLDC motor system of claim 8, wherein the positional information indicates on a rotor that is included in the BLDC motor.

10. The BLDC motor system of claim 8, wherein the BLDC motor is sensor-less.

* * * * *